United States Patent

Neilson

[15] 3,654,916

[45] Apr. 11, 1972

[54] APPARATUS FOR MONITORING RECURRENT WAVEFORMS

[72] Inventor: James McEwan McIntyre Neilson, Edinburgh, Scotland

[73] Assignee: The University of Edinburgh, Edinburgh, S.C.

[22] Filed: Mar. 16, 1970

[21] Appl. No.: 19,715

[30] Foreign Application Priority Data

Mar. 14, 1969 Great Britain..................13,659/69

[52] U.S. Cl. ...................................................128/2.06 A
[51] Int. Cl. ...................................................A61b 5/04
[58] Field of Search.....................128/2.05 R, 2.06 A, 2.06 R

[56] References Cited

UNITED STATES PATENTS

| | | | |
|---|---|---|---|
| 3,215,136 | 11/1965 | Holter et al. | 128/2.06 A |
| 2,524,442 | 8/1970 | Horth | 128/2.06 A |
| 3,533,402 | 10/1970 | Siedband | 128/2.06 A |

Primary Examiner—William E. Kamm
Attorney—Woodhams, Blanchard & Flynn

[57] ABSTRACT

An electrocardiogram waveform is monitored by superimposing the waveform complexes upon a stored waveform complex representative of a 'normal' complex, using derived reference levels and timing data and then integrating successive segments of a waveform complex, measuring the difference between the integrated value of each segment in the complex and the integrated value of a corresponding segment of a normal waveform complex, quantitatively summing the differences and producing a signal and/or record if the total difference exceeds a predetermined value.

14 Claims, 11 Drawing Figures

Fig. 8. CONTROL SECTION

Fig. 9. OPERATIONAL SECTION.

Fig.10. INHIBIT SECTION.

APPARATUS FOR MONITORING RECURRENT WAVEFORMS

The invention relates to apparatus for monitoring recurrent waveforms.

The invention has an important application in apparatus for monitoring electrocardiogram waveforms, hereinafter also referred to as e.c.g. waveforms.

It is frequently necessary to monitor such recurrent waveforms to detect abnormal complexes, for instance it is necessary to detect ventricular ectopic complexes in electrocardiogram waveforms. It is known that such complexes exhibit a difference in shape as compared with normal complexes. Such abnormal complexes are also referred to herein as "foreign" complexes.

The main object of the invention is therefore to provide a method and means for automatically detecting recurrent waveforms and for measuring deviations from the normal over an arbitrary period of time.

According to the invention a method of monitoring a recurrent waveform to detect abnormal waveform complexes in said recurrent waveform comprises the steps of integrating successive segments of a complex of the waveform, measuring the difference between the integrated value of each segment in the complex and the integrated value of a corresponding segment of a normal complex, summing the differences and producing a signal and/or record if the total difference exceeds a predetermined value. When the summation of the differences is effected purely quantitatively, the result is indicative of differences in shape.

The difference in shape may be used to initiate a control signal for the purpose of determining whether the complex is an abnormal or "foreign" complex.

The invention also consists in apparatus for monitoring recurrent waveforms to detect abnormal complexes comprising means for integrating successive segments of a waveform complex, means for determining the difference between the integrated value of each segment and that of the corresponding segment of a normal complex, means for adding the magnitude of said differences to determine the resultant difference and means for indicating whether the magnitude of said resulting difference indicates a foreign complex.

The invention furthermore includes the use of the first and second derivatives to perform other functions as will be hereinafter referred to. The invention also includes the employment of a delay line arranged to permit the "gating out" of certain parts of the complex for the purpose of making measurements on the remaining parts, and to permit the proper timing of successive control signals for operating integrators of segments of the complex. The invention also includes means for measuring the time interval between successive complexes, and means for detecting either high frequency of low frequency interference. The invention may also include logic circuitry for analyzing the results designated under various categories such as "normal shape," "early normal" "-foreign shape," "early foreign shape" and to generate command pulses for controlling the integrating means in particular ways in dependence on such results.

The invention further includes means for inhibiting outputs from the monitoring apparatus when the input signals are degraded by an arbitrary noise level.

In order that the invention may be more clearly understood, it will be explained in more detail with reference to an example illustrated in the accompanying drawings in which.

Figure 1:
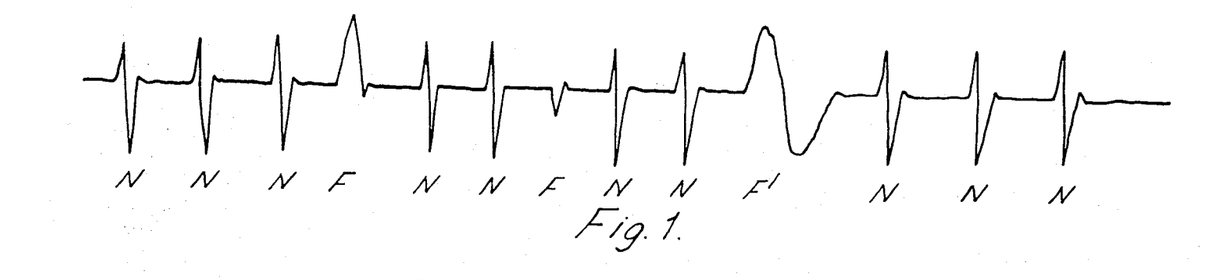
FIG. 1 shows an example of a recurrent waveform to which the invention is applicable.

The invention is applicable, generally, to waveform consisting of a train of essentially similar transients such as those marked N in FIG. 1, so as to detect the presence and time of occurrence of individual transients in the train, such as those marked F and F' in FIG. 1, which are appreciably different in shape from that of the prevailing transients N.

Figure 2:
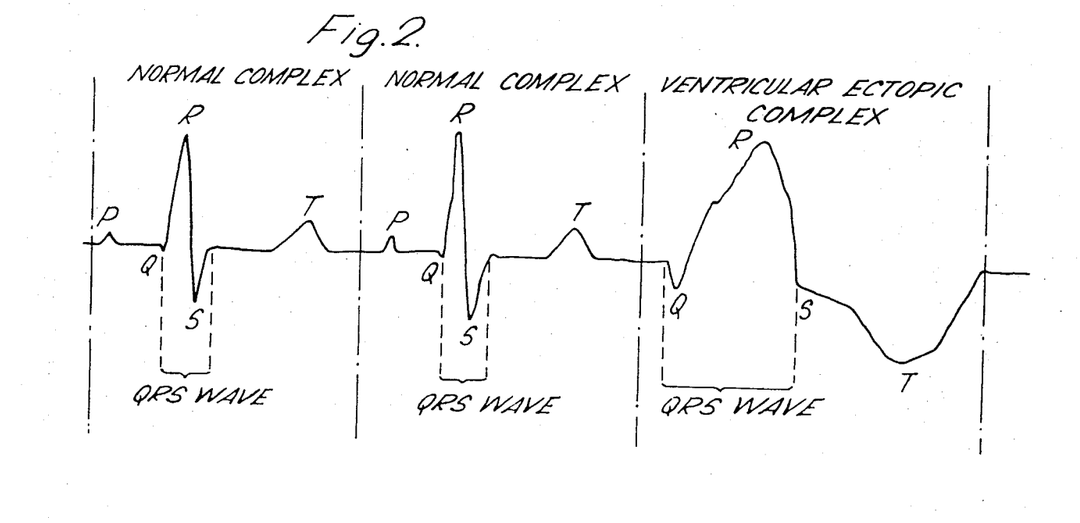
FIG. 2 is an enlarged view of three cycles of the waveform illustrating a foreign complex.
Figure 3:
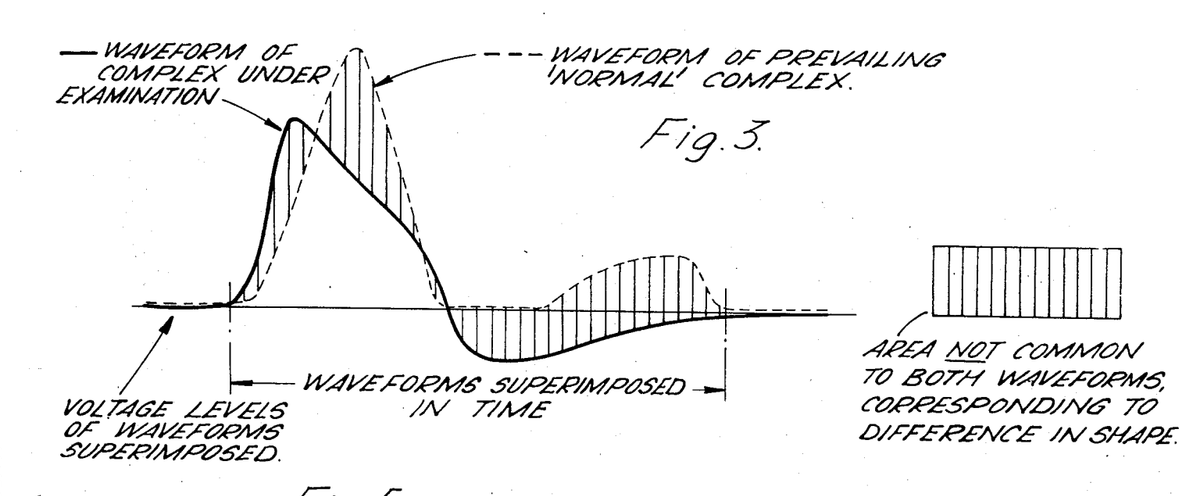
FIG. 3 explains graphically the method of comparing a sample complex with a normal complex.

Referring to FIGS. 2 and 3, these illustrate the application of the invention to the particular problem of monitoring electrocardiogram (e.c.g.) waveforms to detect abnormalities, for example, ventricular ectopic complexes on the basis that these complexes invariably differ in shape from the "normal" e.c.g. complex.

The method and apparatus now to be described makes possible the automatic detection of oddly shaped ('Foreign') complexes in the electrocardiogram, particularly ventricular ectopic complexes.

The method according to the invention may include the following operations:

1. Each individual e.c.g. complex is detected as it arrives by differentiating the e.c.g. signal twice to emphasise the relatively sharp corners of the QRS wave. Each QRS wave produces a group of peaks in the second derivative signal such QRS peaks being in general greater than any peaks due to other parts of the e.c.g. complex and noise. These largest second derivative peaks are used to establish the approximate location in time of each QRS wave.

By "blanking out" another version of the same second derivative signal during the periods thus established as including the QRS peaks, the level of the second derivative signal corresponding to the rest of the e.c.g. complex plus noise is measured and used to establish a threshold level automatically proportional at all times to this remaining "inter-QRS background." This threshold level is compared with the original (unblanked) second derivative signal. The crossings of the threshold level by the QRS peaks of the unblanked second derivative signal are used to determine the start and the 'center' in time of the QRS wave.

2. Each individual e.c.g. complex is electronically superimposed both in time (using the timing signals derived from the QRS wave above), and in voltage level (by making all measurements with reference to a level obtained by sampling the waveform immediately before the start of each QRS wave), with a sample of the prevailing 'normal' complex stored within the circuit.

The total area not common to both the stored sample waveform and that of the complex being examined is calculated (shaded area FIG. 3) and used as a measure of the difference in shape between the current complex and the stored sample.

If this difference in shape exceeds a preset limit the current complex is detected as 'Foreign.' If the difference in shape so calculated is less than some (not necessarily the same) pre-set limit the current complex is detected as 'Normal.'

The detection of a complex of 'Foreign' shape may be used to generate an output from the circuit signifying the detection of a ventricular ectopic complex.

Figure 4:
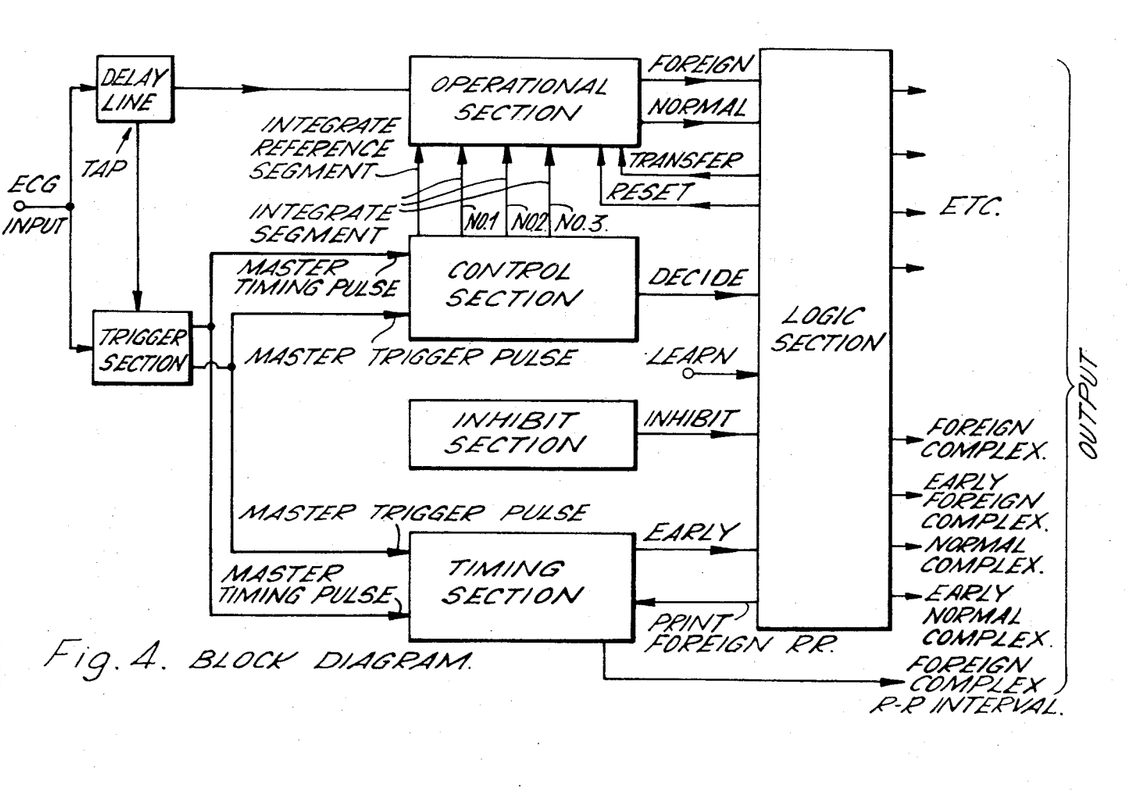
FIG. 4 shows in block form the general arrangement of monitoring apparatus embodying the invention.

The block diagram of the system is shown in FIG. 4. The incoming e.c.g. signal is fed through a Delay line to the operational section (FIG. 9) in which measurements are made of the shape of the complexes in the delayed replica of the original signal.

Meanwhile the original e.c.g. signal, and a version of the e.c.g. signal which has suffered a lesser delay in the delay line are fed to the trigger section (FIGS. 6 and 7) in which the appearance of each QRS wave is detected using peaks of the second derivative signal and used to generate a master timing pulse and a master trigger pulse for each QRS wave detected.

Figure 7:
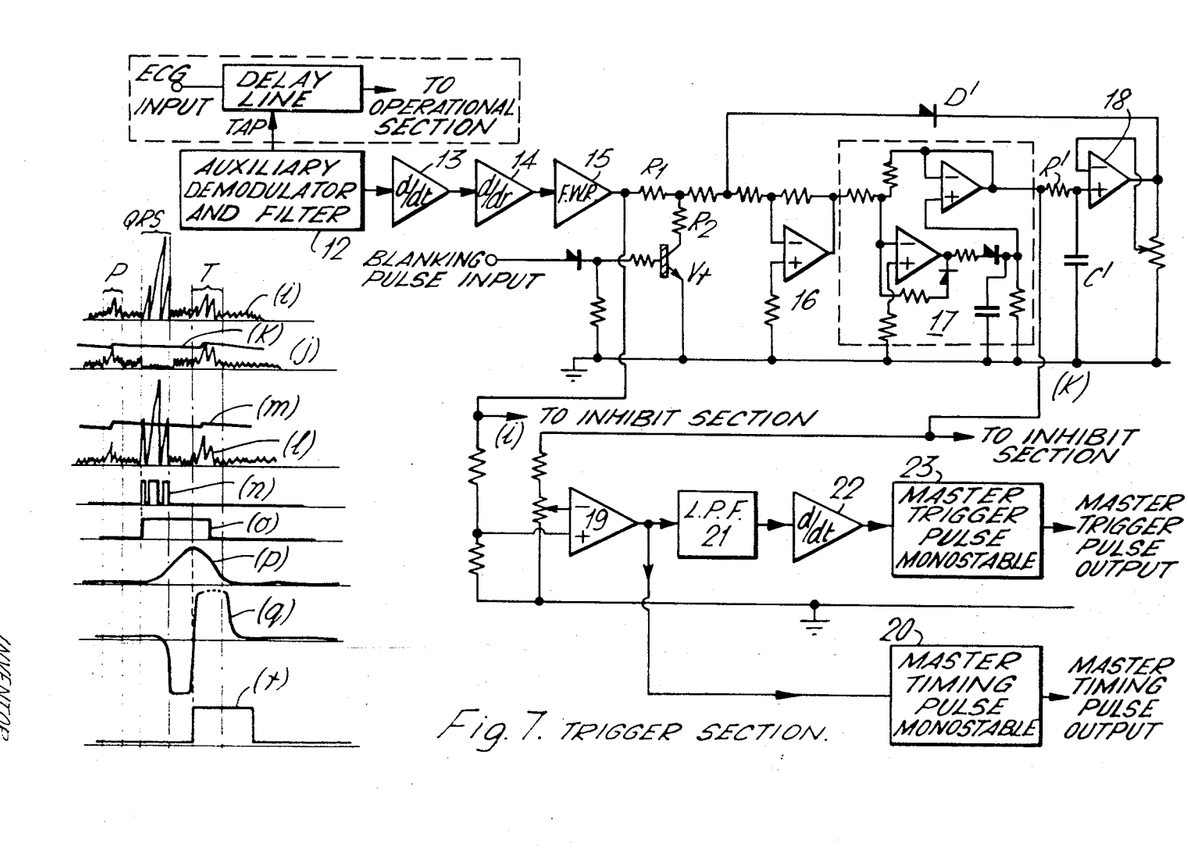

The master trigger pulses and master timing pulses are fed to the control section (FIG. 8) in which a sequence of control pulses is generated and fed to the operational section (FIG. 7)

and logic section (FIG. 11) initiating and timing the operations carried out in these sections.

Figure 9:
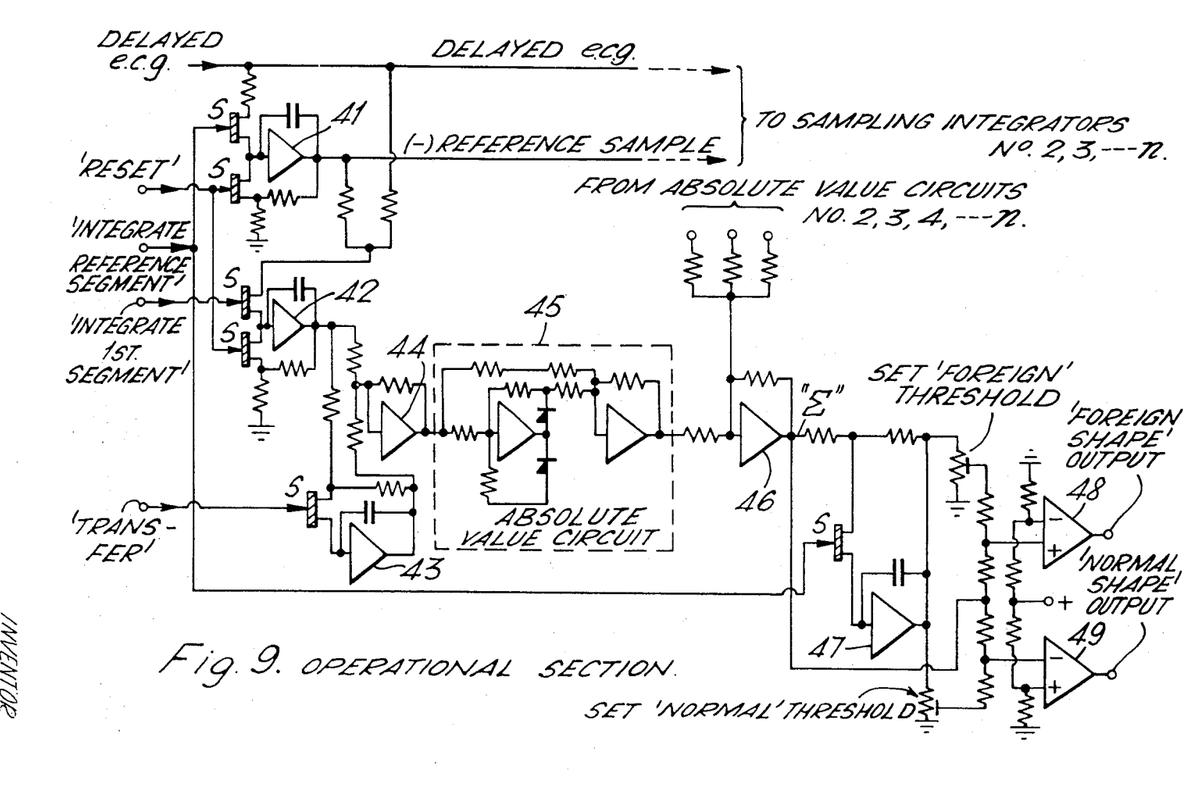
FIG. 9 shows an example of an Operational section.

In the operational section electronically switched operational amplifiers sample the delayed e.c.g. complexes to obtain a zero level immediately preceding their QRS waves, then integrate successive segments of the waveform relative to this zero level and subtract the areas measured in these segments from the areas of corresponding segments in the sample normal e.c.g. waveform stored in a set of sample/hold circuits. Other operational amplifiers in this section calculate the sum of magnitudes of the differences ($\xi$) between corresponding segments in the two complexes, and generate logic voltage levels "Foreign Shape" or "Normal Shape" according to whether $\xi$ exceeds or does not reach preset "Foreign" or "Normal" thresholds.

The master timing pulses are also fed to a timing section in which a linear time base waveform is sampled on the arrival of each trigger to produce a measure of the interval between the incoming QRS wave and its predecessor. This interval is compared with a pre-set threshold (400–500 msec) and if this value is not reached a logic signal 'early' is generated.

When sufficient time has elapsed since the arrival of the complex for an adequate portion of its waveform to have been compared with that of the stored 'Normal' complex a 'decide' pulse is generated by the control section and fed to the logic section.

In the logic section the logic voltage levels 'Foreign Shape,' 'Normal Shape,' 'Early,' etc. are combined on the arrival of the 'Decide' pulse to produce an output pulse at one or more outputs corresponding to 'Normal Complex,' 'Early Normal Complex,' 'Foreign Shaped Complex,' 'Early Foreign Shaped Complex,' etc.

If the complex is found to be of 'Normal Shape' the logic section generates a 'Transfer' pulse which is fed to the operational section causing the sample/hold stores containing the stored 'Normal' waveform samples to up-date their contents by sampling the contents of the integrators holding the current waveform samples. The integrators are then re-set to zero in readiness for the arrival of the next complex.

If the complex is not judged to be of 'Normal Shape' the stored samples are not up-dated but the integrators are re-set immediately after the 'Decide' pulse. The Inhibit section generates signals which are used to prevent all outputs from the computer during periods of excessive interference.

When the system is put into operation on an e.c.g. signal an operator observing the waveform on an oscilloscope or pen recorder presses a push switch during the passage of a few e.c.g. complexes of the type he wishes the system to regard as 'Normal.' This switch injects a logic voltage level 'learn' into the logic section temporarily altering the way in which the various logic signals are combined so as to produce a 'Transfer' pulse for every complex appearing while the switch is pressed. In this way the waveform of the desired 'Normal' e.c.g. complex is stored initially in the sample/hold stages in the operation section.

The operation of individual sections of the system will now be considered in more detail.

Figure 5:
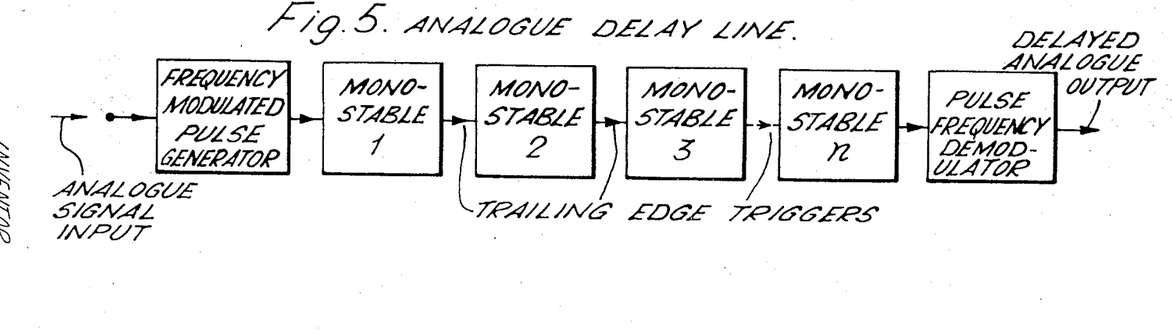
FIG. 5 shows in greater detail an example of a delay line suitable for use in the apparatus of FIG. 4.

The Delay Line (Figure 5)

The incoming signal is used to frequency modulate a pulse generator. The frequency modulated pulse train is fed to the input of a long chain of monostable circuits arranged in cascade so that the trailing edge of the pulse produced by each monostable stage triggers the start of the pulse in the next monostable. The frequency modulated pulse train emerging from the last monostable in the chain is demodulated to reproduce the original signal faithfully but with a time delay equal to the sum of the durations of the pulses produced by each monostable. Thus if fifty monostables are used each generating a 2 msec pulse in turn the total delay is 100 msec.

Figure 6:
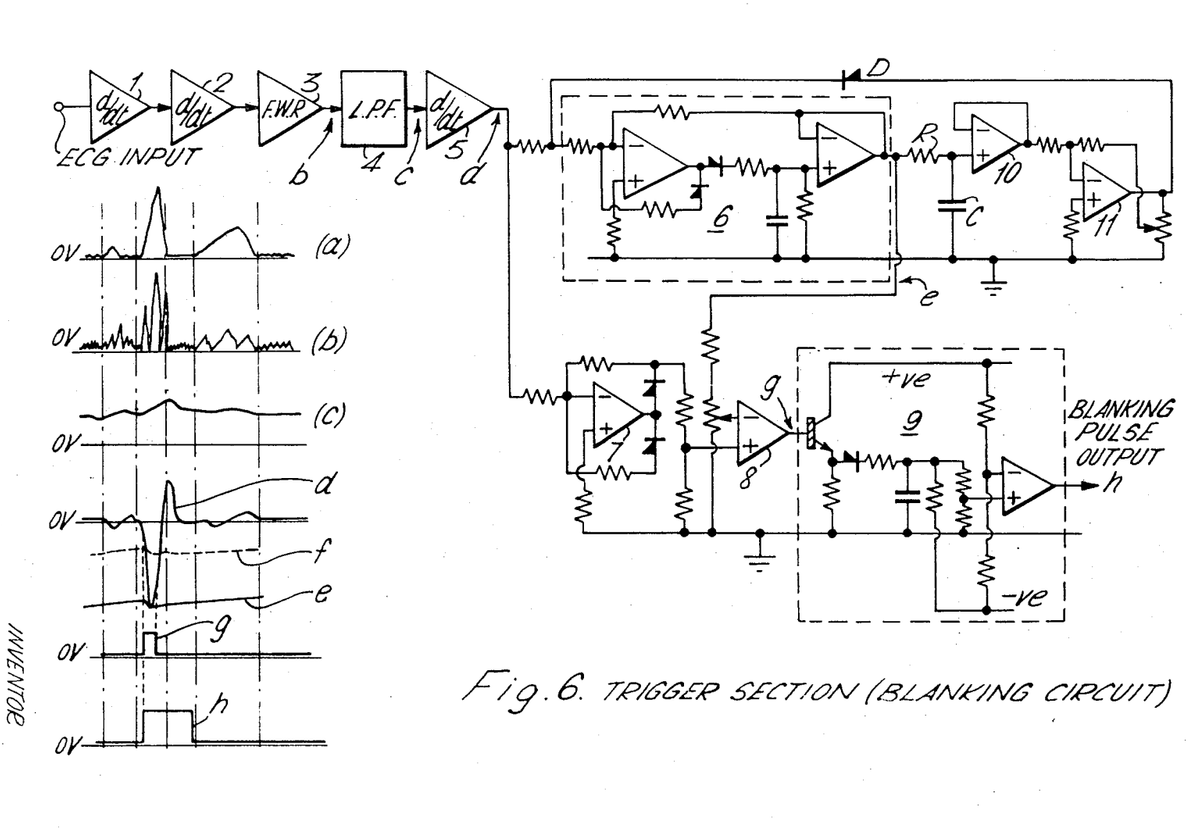
FIGS. 6 and 7 show an example of a trigger section.

The Trigger Section (Figures 6 and 7)

This section of the invention detects the presence of individual complexes in the incoming e.c.g. signal by sensing the QRS wave in each complex and generating two pulses on the occurrence of each QRS wave, viz, a master timing pulse, having a fixed time relationship to the start of the QRS wave, and a master trigger pulse having a fixed time relationship to the middle of the period occupied by the QRS wave.

The trigger section achieves this in two stages.

Firstly, in the "Blanking" circuit of the trigger section, the times of occurrance of the QRS waves are determined approximately. A blanking pulse is generated at this approximate time having a duration appreciably longer than the duration of the QRS wave as estimated by the blanking circuit.

Secondly, a suitably delayed replica of the incoming signal is used together with the blanking pulses (which last for a period starting before, and continuing until after, the probable occurrence of a QRS wave in this delayed version of the signal) to separate those periods of the signal which do *not* include QRS waves. From the 'blanked' signal so formed, the level of 'background noise' of the signal due to all other features of the e.c.g. ($p$ waves, T waves, interference, etc.) is measured and used to generate a main trigger threshold at a level continuously and automatically adjusted to ride above the background noise.

QRS waves sufficiently above the background noise level will exceed the main trigger threshold and generate master timing pulses and master trigger pulses.

The operation is as follows:

In the Blanking circuit of the Trigger Section (FIG. 6) the incoming e.c.g. signal $a$ is passed through differentiators 1 and 2 and full wave rectifier 3 to produce a waveform $b$ representing the magnitude of its second derivative. This waveform is smoothed in low pass filter 4, the output of which $c$ represents the envelope of the magnitude of the second derivative signal. Differentiator 5 processes this envelope to produce a (negative peak) each time the envelope increases significantly in amplitude. The QRS waves will generally result in the largest such negative peaks in the differentiator output $d$. The peak value $e$ of these largest negative pulses is extracted by operational amplifier peak rectifier 6. The negative peaks of waveform $d$ are separated by half wave rectifier 7 and fed to a comparator 8 together with a threshold level $f$ which is a proportion of the peak value $e$. The proportion is pre-set so that the threshold $f$ lies above the small peaks in $d$ representing the $p$ and T waves. For example, this may be about one-third of the peak value $e$ of the negative pulses representing QRS waves.

A positive pulse $g$ will appear at the output of comparator 8 whenever the negative pulse associated with a QRS wave crosses the threshold $f$. The output of comparator 8 is applied to a 'stretch' circuit 9 in which a capacitor is rapidly charged to a fixed voltage during each pulse $g$ and allowed to discharge only after the end of each such pulse. When the capacitor is so charged a positive 'Blanking pulse' $h$ appears at the output of the stretch circuit comparator and remains present until the capacitor has discharged from the above fixed voltage to some pre-set lower voltage. The stretch circuit operates so as to extend each pulse $g$ by a fixed time so chosen that the Blanking pulse duration exceeds the duration of the QRS wave initiating it by, for example 150 msec.

Occasional features in the incoming e.c.g. waveform such as large ventricular ectopic complexes, noise transients, etc, are prevented from disturbing the blanking threshold $f$ by an arrangement in which the value, averaged over several complexes, of the peak rectified waveform $e$ is sensed by the low pass filter RC connected to the output of the peak rectifier 6. This "average peak value" signal is passed via a voltage follower stage 10 and an inverter stage II to the anode of clipping diode D. The gain of the inverter stage II is adjusted so that the voltage at the anode of diode D very slightly exceeds that of the peaks of the incoming signal $d$. Occassional large peaks in waveform $d$ are clipped by diode D at a level just above the average peak value over the last few complexes and prevented from entering the peak rectifier 6.

FIG. 7 shows the remaining circuits of the trigger section. At a suitable point along the chain of monostables forming the computer's delay line, an adjustable tap is provided feeding the delay line pulses to an auxiliary demodulator/filter 12. The delayed version of the incoming e.c.g. signal so obtained is twice differentiated in differentiators 13 and 14 and full wave rectified in rectifier 15 to produce a waveform $i$ representing the magnitude of the second derivative of this delayed version of the e.c.g. signal.

Blanking pulses from the blanking circuit (FIG. 6) are fed to transistor $V_T$ causing it to conduct during, but only during, each blanking pulse. Resistors $R_1$ and $R_2$ are chosen so that, during a blanking pulse when $V_T$ is conducting, the output of the rectifier 15 reaching point X can be attenuated by a factor chosen to eliminate almost completely the part of waveform $i$ representing the QRS wave. The attenuation introduced may be for example 10:1.

The waveform at point X is then a replica of the waveform $i$ except that for a period including the whole of the QRS parts, and extending slightly before and after them the amplitude is greatly reduced. This 'blanked' waveform is shown at $j$. Inverter 16 and peak rectifier circuit 17 produce an output $k$ equal to the peak value reached by the blanked waveform $j$, that is the peak value of the "background noise."

The average over several complexes of this peak background noise level $k$ is sensed by filter section R'C' and transmitted via a voltage follower to the cathode of diode D'. The gain of the voltage follower 18 is adjusted so that the potential on the cathode of D' very slightly exceeds the peak value of the background noise. Sudden increases in the 'background noise' signal such as may occur if a small ectopic QRS wave is not blanked are prevented from disturbing the peak background noise signal $k$ since such transients will be clipped by diode D' at a level just above the average peak noise level.

A fraction 1 of the unblanked output $i$ of rectifier 15, including the peaks representing the QRS waves, is presented to comparator 19 where it is compared with a larger adjustable fraction of the peak background noise signal $k$ set so as to provide a Main Threshold level $m$ proportional to, but greater than, the peak level of the background noise as it appears in waveform 1. Comparator 19 produces a positive pulse for each peak (for example in a QRS group of peaks) of waveform 1 which exceeds the main threshold level $m$. The first pulse of each such group of positive pulses $n$ at the output of comparator 19 triggers the Master Timing Pulse Monostable 20 which produces at its output a master timing pulse $o$. The leading edge of this master timing pulse bears a fixed time relationship to the start of the QRS wave.

The groups of pulses $n$ representing the sharp corners of incoming QRS waves are passed from the output of comparator 19 into a low pass filter 21. This filter may have a fourth order Butterworth response and a cut off frequency of, for example, 5 Hz. The output $p$ of the filter 21 will reach its peak at a fixed time after the arrival of the 'center' of each such group of pulses $n$ at the input of the filter. The peak of the filter output $p$ is detected by passing this waveform through differentiator 22 and using the zero crossing edge of the differentiator output $q$ to trigger the Master Trigger Pulse Monostable 23.

The leading edges of the master trigger pulses produced by this monostable have a fixed time relationship to the 'centers' of the QRS waves initiating them.

Figure 8:
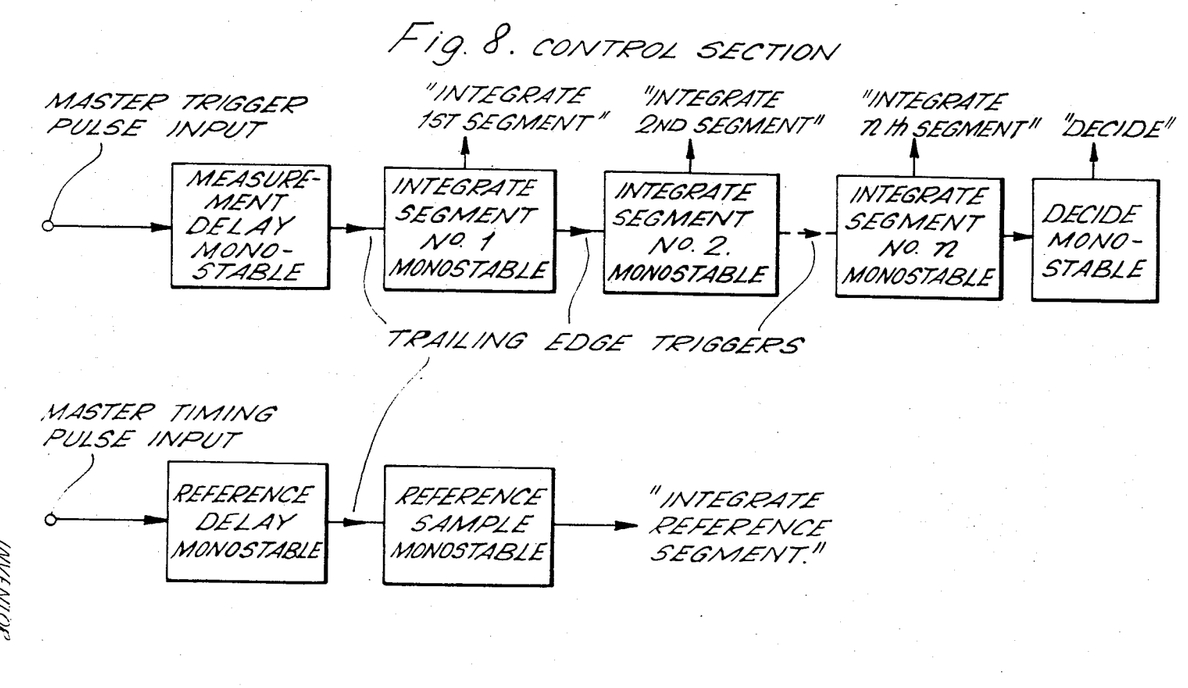
FIG. 8 shows an example of a control section.

The Control Section (Figure 8)

Master trigger pulses and master timing pulses from the trigger section operate two sets of monostable circuits in which each stage is triggered by the trailing edge of the output pulse from the previous stage.

In the set operated by the Master Timing Pulse, the first monostable (Reference Delay) provides an output pulse of adjustable duration so that the pulse from the next monostable, 'Integrate reference segment,' can be arranged to occur during the 20 msec period immediately preceding the emergence of the QRS wave from the Delay Line. This command pulse causes an integrator in the Operational Section to acquire an output representing the mean level of the e.c.g. waveform over this 20 msec reference segment. The duration of the sample is chosen to be equal to one or more whole periods of the AC supply mains so that the reference sample acquired cannot contain any contribution due to AC interference on the e.c.g. signal. Similarly the Master Trigger Pulse operates a monostable (Measurement Delay) providing an output pulse of adjustable duration so that the pulse from the next monostable 'Integrate Segment No. 1' can be arranged to occur during the desired period just before or at the start of the delayed QRS wave entering the Operational Section.

The end of 'Integrate Segment No. 1' pulse triggers the next monostable to produce 'Integrate Segment No. 2' pulse and so on down the chain each monostable operating a corresponding integrator in the Operational Section. The integrators each run for the duration of their command pulses (preferably a multiple of 20 msec when the AC mains frequency is 50 c/s), then revert to their 'hold' mode.

When sufficient segments of the e.c.g. complex have thus been sampled, the trailing edge of the last 'Integrate segment No. N' pulse triggers a monostable producing the 'Decide' pulse which is fed to the Logic Section.

The Operational Section (Figure 9)

A part of the Operational Section embodying only the first segment stage is shown in FIG. 9. The delayed e.c.g. signal from the Delay Line is integrated by an electronically switched Reference Sample Integrator 41 throughout the duration of the 'Integrate Reference Segment' command pulse from the second monostable of the Control Section. At the end of this pulse the integrator reverts to its 'hold' mode, maintaining at its output a voltage representing the level of the e.c.g. waveform in the reference segment before the QRS wave. Mode switching of the integrator is performed by field effect transistor switches, S, operated by the command pulses.

The arrival of the command pulse (Integrate Segment No. 1) causes another Sampling Integrator 42 to integrate the difference between the delayed e.c.g. signal and the reference sample being held at the output of the Reference Sample Integrator 41. During this first measurement segment, Sampling Integrator 42 acquires at its output a voltage representing the area bounded by the e.c.g. waveform and the start and finish of the segment, referred to the zero level defined by the reference sample (FIG. 3). The difference between this signal and the value for the corresponding segment in the stored 'Normal' e.c.g. waveform held in the sample/hold stage 43 is obtained in the Subtractor Stage 44. The magnitude (i.e., regardless of sign) of this difference is calculated in an operational amplifier 'Absolute Value Circuit' 45.

It will be understood that for each of the subsequent measurement segments along the e.c.g. waveform a further set of operational amplifier stages each comprising Sampling Integrator (like 42), Sample/Hold Stage (like 43), Subtractor Stage (like 44), and Absolute Value Circuit (like 45), is provided. Each such group of stages is operated by a command pulse from the Control Section during its own measurement segment.

Preferably the number and duration of the measurement segments is chosen so that the period from the start of the first measurement segment to the end of the last extends over the e.c.g. complex without a break from before the earliest start of any QRS wave to well after the end of the widest QRS wave expected. At the end of its own segment each set of stages holds at the output of its Absolute Value Circuit a signal representing the magnitude of the difference between the area within that segment of the e.c.g. complex being examined, and the area of the corresponding segment in the stored 'normal' e.c.g. complex.

The outputs of all the sets are summed in an Operational Adder 46 to produce a signal representing the Sum of the Magnitudes of the Differences ($\xi$). This signal is a measure of the difference in shape between the complex being examined and the 'normal' complex represented by the samples in the Sample/Hold stores.

If the difference in shape is small, this signal ($\xi$) will decrease towards zero at the completion of integration of the last measurement segment. At this instant the 'Decide' pulse is generated and the value of $\xi$ is compared with two threshold levels corresponding to 'Foreign Shape' and 'Normal Shape' respectively. If the complex examined is of 'normal' shape ($\xi$ less than 'normal' threshold level), the Logic Section generates a command pulse 'Transfer' causing the Sample/Hold stages (e.g., 43) to sample the values for this complex held at the outputs of the Sampling Integrators (e.g., 42).

Immediately after the 'Transfer' pulse (if any) all the Sampling Integrators are re-set to zero by a 'Reset' command pulse from the Logic Section. When a 'Foreign Shaped' complex has been detected the Reset pulse is generated immediately after the 'Decide' pulse and no 'Transfer' command pulse is generated.

When the Sampling Integrators have been re-set to zero, and before the sampling of the next complex begins, the signal $\xi$ represents the sum of the magnitudes of the stored 'normal' complex segments, i.e., the 'total area' of the complex. This level is sampled during the 'Integrate Reference Segment' command pulse by Sample/Hold stage 47 and suitable fractions of this stored 'Total area' signal are fed into the Shape Comparator stages 48, 49 to provide the threshold levels for comparison with the signal $\xi$ at the moment of 'Decide'

Fixed, pre-determined voltages are added to the fractions of the 'Total Area' signal fed to the Shape Comparator Stages. These fixed voltages may be chosen to provide minimum values of the 'Foreign' and 'Normal' Thresholds in the event of the 'Total Area' signal being very small for certain types of e.c.g. signal.

Figure 10:
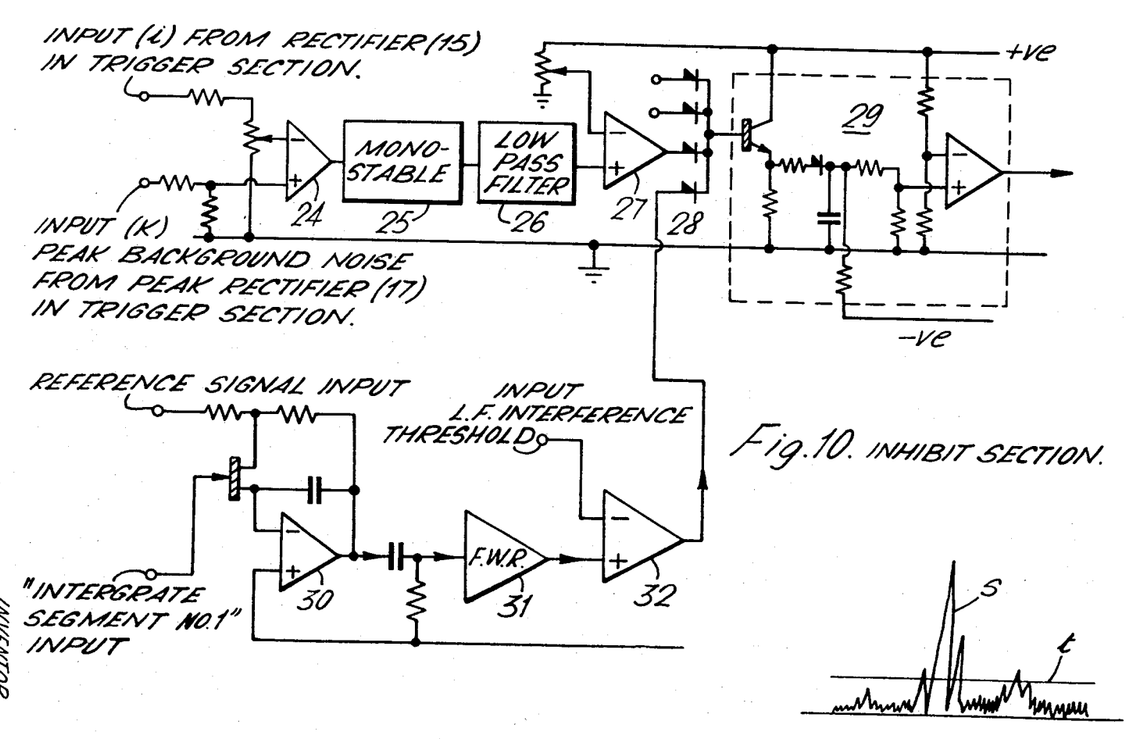
FIG. 10 shows an example of an Inhibit section.

The Inhibit Section (Figure 10)

The function of this section is to inhibit all outputs from the computer during any period when the input e.c.g. signal is degraded by interfering 'noise' which is severe enough to disturb the correct analysis of the e.c.g. signal. Such interference may be of high frequency (e.g., muscle potential artefact), or low frequency (e.g., base line fluctuations), or both. The inhibit section can similarly suspend the action of the computer on receiving an external command signal for example from cardiac pacing equipment.

FIG. 10 shows the inhibit section circuitry. For the detection of high frequency (H.F.) interference a fraction S of the waveform $i$ at the output of full wave rectifier 15 in the Trigger Section (FIG. 7) is compared with an 'H.F. Interference Threshold' $t$ derived from the peak background noise signal $k$ (FIG. 7). The comparison is effected by comparator 24 (FIG. 10). The threshold $t$ is set preferably so that while it is exceeded by all QRS peaks and some $p$ wave and T wave peaks, it will not be exceeded by high frequency noise peaks in waveform S which are well below the Main Trigger Threshold level which will be set somewhat higher than the T wave and p wave peaks. A rapid rise in amplitude of the H.F. noise peaks will allow them to cross the threshold $t$. The frequency of this threshold crossing will thus increase in the presence of significant H.F. noise. The frequency of such crossings is monitored by a conventional ratemeter circuit comprising monostable 25 and low pass filter 26. Increase in the measured rate beyond a pre-set limit is detected by comparator 27 which produces a positive 'H.F. Interference Warning' pulse at its output. This warning pulse is fed through diode OR-gate 28 to a Stretch circuit 29 which produces at its output an 'Inhibit' pulse of duration equal to that of the warning pulse applied to the OR gate plus a time chosen to allow all signals present in the Delay line at the time of the warning pulse to have passed through the Operational Section before the 'Inhibit' pulse terminates. The duration of this additional 'Stretch' time will be preferably greater than the time elapsing from the arrival of a signal at the computer input to the moment of the Decide Pulse generated when that signal arrives in the Operational Section. For example the stretch time may be 500 msec.

The 'Inhibit' pulse is fed to the Logic Section preventing all outputs while it is present.

The detection of low frequency (LF) interference such as base line fluctuations is accomplished by sampling the Reference signal present at the output of the Reference Segment Integrator 41 (FIG. 9) in the Operational Section at each successive complex during the 'Integrate Segment No. 1' command pulse from the control section. This is carried out by the Sample/Hold stage 30 in FIG. 8. Any sudden change in level of the Reference Signal is thus communicated via an AC coupling section to Full Wave Rectifier 31. The magnitude of the change in reference level at the output of rectifier 31 is sensed by comparator 32, whenever the change exceeds a threshold level corresponding to a serious baseline fluctuation. This threshold is derived from a combination of a fixed voltage with a suitably chosen fraction of the 'Total Area' signal at the output of the Total Area Sample Hold stage 47 (FIG. 9).

When a change in Reference Signal of such magnitude is detected a 'LF Interference Warning' pulse is fed by Comparator 32 into one of the inputs of OR-gate 28 resulting in an 'Inhibit' pulse from Stretch circuit 29.

Command pulses from external apparatus may be fed into any of the further inputs to OR-gate 28 to initiate inhibit pulses as desired.

Figure 11:
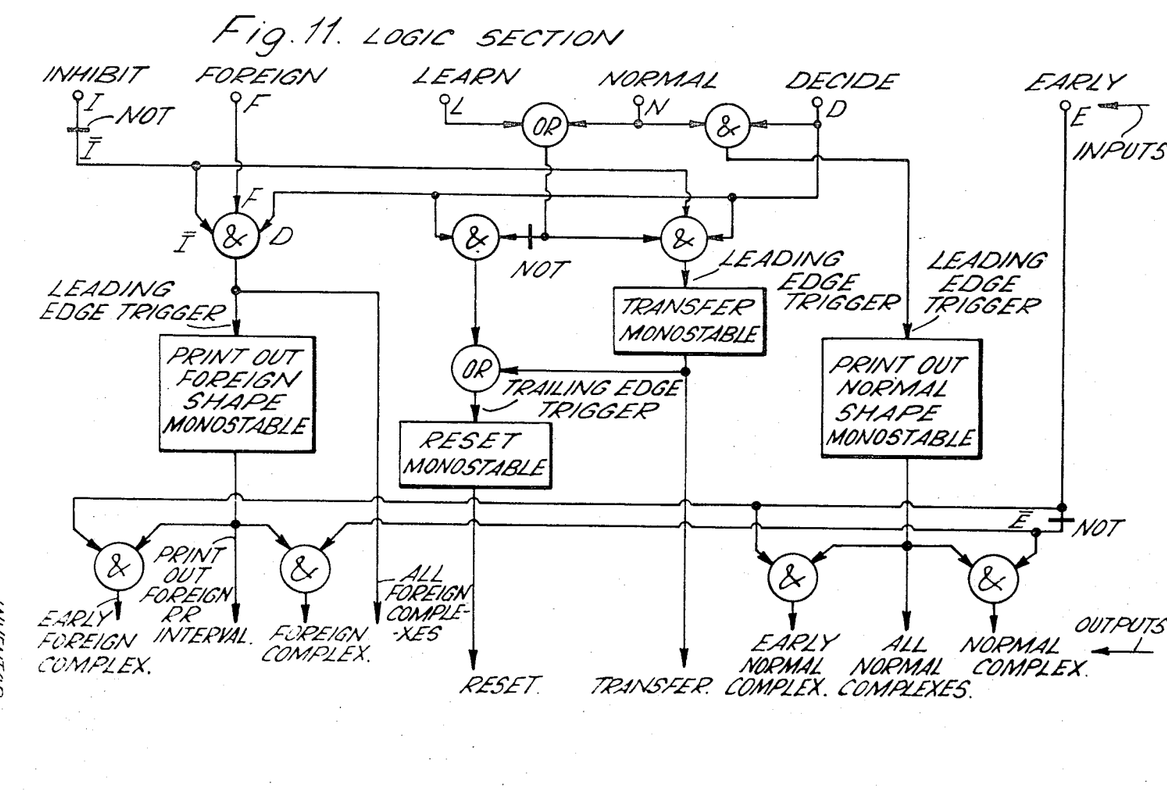
FIG. 11 shows an example of a logic section.

The Logic Section (Figure 11)

FIG. 11 shows one arrangement of electronic logic elements which may be used to combine the logic levels 'Foreign Shape (E),' 'Normal Shape (N),' 'Early (E),' 'Decide (D),' 'Learn (L),' etc. to obtain the correct function of the system generating command pulses 'Transfer,' 'Reset,' and a variety of outputs such as Foreign Complex, Early Foreign Complex, Normal Complex Early Normal Complex, etc. Other arrangements are possible.

Some of the incoming logic levels are passed through logic 'Not' elements to generate logic signals representing 'Not Foreign ($\overline{F}$),' 'Not Normal ($\overline{N}$),' 'Not Early ($\overline{E}$),' 'Not Learn ($\overline{L}$),' etc. These signals and the incoming ones are combined in AND and OR gates as shown to trigger monostables generating the 'Transfer' 'Reset' and any desired 'Print-Out' signals. In addition to the outputs illustrated many other outputs may be obtained from the system by arranging 'Print-Out' signals from the Logic Section to operate electronic switches to sample and feed out any of the waveforms present in any chosen section of the system. For example, a pulse whose amplitude represents the time interval between the QRS wave of each 'Foreign' complex detected and the previous QRS wave can be obtained by arranging the 'Foreign Complex' output to sample the current inter-QRS wave interval being held in the Sample/Hold store in the Timing Section.

The system according to the invention is capable of being adapted to the solution of further problems.

As described so far the system according to the invention is capable of recognising automatically and 'on-line,' the broad categories into which individual e.c.g. complexes fall, viz, Normal, Foreign, Early, and combinations of these. Its range of performance can be greatly extended by making use of this capability by using these outputs in combination with additional circuits (not shown in the drawings) incorporated into the system to diagnose automatically certain other well known disturbances of heart rhythm characterized by the occurrence of particular types of complex at certain rates and with various degrees of regularity of rate and regularity of complex shape. Thus:

a. Ventricular Fibrillation is characterised by extreme irregularity of shape of the "complexes" of the e.c.g. The 'Foreign Shape' output pulses can be used to sample the sum of the magnitudes of the Differences signal ($\xi$) at the instant of 'Decide' resulting in a stepwise waveform of extreme irregularity. This waveform is AC coupled to produce a series of exponentially decaying transients of amplitude proportional to the beat by beat changes in shape. This train of transients is full wave rectified and smoothed to produce a voltage level related to the "mean irregularity of shape" of the e.c.g. complexes. If this voltage level exceeds a preset threshold a signal 'Ventricular Fibrillation Present' is generated.

b. Ventricular Tachycardia

The output pulses representing 'Early Foreign Complexes' are passed through a low pass filter to produce a voltage level proportional to the frequency of those early ventricular ectopic complexes. Three or more appearing in succession will cause the filter output voltage to exceed a threshold level generating a Ventricular Tachycardia Present Signal.

c. Atrial Tachycardia

Output pulses from the Logic Section representing 'Normal Shape' complexes are passed to a conventional pulse counting ratemeter. If the rate of normal shaped complexes exceeds a preset level an 'Atrial Tachycardia' signal is generated.

d. Excessive Ventricular Ectopic Complexes

Output pulses from the Logic Section representing 'Foreign Complex' indicate ventricular ectopic complexes. These pulses are fed into a conventional pulse counting ratemeter and an 'Excessive Ventricular Ectopic Complexes Present' signal is generated when the ratemeter output crosses a threshold corresponding to a preset limit of, say, five per minute.

e. Atrial Fibrillation

The output of the Sample/Hold stage in the Timing Section representing the beat by beat intervals between complexes is AC coupled to produce a train of exponential transients which is full wave rectified and filtered as in (a) above. If the resulting voltage level representing the 'mean irregularity of the heart rate' exceeds a preset threshold level a 'Heart rate irregular' signal is produced. This signal is combined in a logic AND gate with a 'Not Excessive Ventricular Ectopic Complexes' signal derived from the arrangement (d) above to generate an 'Atrial Fibrillation Present' signal.

I claim:

1. A method of monitoring a recurrent waveform to detect abnormal waveform complexes consisting in the steps of sensing the recurrent waveform, integrating and storing segments of a normal waveform complex, integrating successive segments of a waveform complex to be compared, measuring the difference between the integrated value of each segment in the complex to be compared and the integrated value of a corresponding segment of the normal waveform complex, quantitatively summing the differences and producing a signal if the total difference exceeds a predetermined value.

2. A method according to claim 1 including using the normal waveform complex to provide a reference waveform, deriving, from the recurrent waveform, timing signals which represent the time location of particular selected parts of the waveform complex required to be compared with corresponding parts of the stored normal complex, deriving a reference voltage level by sampling the recurrent waveform immediately before the start of each complex, and superimposing each waveform complex, by the aid of said timing signals and said reference voltage level, upon the stored reference waveform before effecting said successive integration of segments.

A method according to claim 2 wherein said timing signals are derived from the waveform by firstly differentiating each waveform complex twice to obtain peak signals representing the approximate time location of the particular part of the waveform complex selected for comparison with the stored complex, secondly blanking out another version of said second derivative signals during the periods thus established as including said peaks to obtain a threshold level representative of the remainder of the complex plus noise, and comparing the original unblanked second derivative signals with said threshold level to determine the "start" and "center" of that part of each individual waveform complex which is to be superimposed on the stored reference waveform.

4. A method according to claim 3 including feeding the recurrent waveform through a delay line to a trigger section to generate a master timing pulse and a master trigger pulse for each detected waveform complex.

5. A method according to claim 4 wherein said integration of the corresponding segments of the normal waveform complex to be stored and the superimposed waveform complex to be compared with it is successive and carried out by operational amplifiers and including electronically switching the operational amplifiers under the control of the master timing pulses and the master trigger pulses.

6. A method according to claim 5 including obtaining the differences between each integrated segment of the waveform complex and the stored reference waveform and obtaining the sum of the magnitudes of said individual differences over a time interval and selecting the time interval to include the start of the waveform complex and the end of the widest expected waveform complex.

7. Apparatus for monitoring recurrent waveforms to detect abnormal waveform complexes in said recurrent waveform comprising means for sensing the recurrent waveform, means for integrating and storing segments of normal waveform complex for use as a reference, means for integrating successive segments of a waveform complex to be compared, means for determining the difference between the integrated value of each segment and that of the corresponding segment of the normal complex, means for adding the magnitudes of said differences irrespective of sign to determine the resultant difference, and means for indicating whether the magnitude of said resulting difference indicates an abnormal complex.

8. Apparatus according to claim 7 including a trigger section for deriving, from the recurrent waveform, timing signals which represent the time location of particular selected parts of the waveform complexes required to be compared with corresponding parts of the stored normal complex, means for sampling the waveform immediately before the start of each complex and deriving a reference voltage level, and means for superimposing each waveform complex, by the aid of said timing signals and said reference voltage level, upon the stored reference waveform.

9. Apparatus according to claim 8, wherein said trigger section includes means for differentiating each waveform complex twice to obtain peak signals representing the approximate time location of the particular part of the waveform complex selected for comparison, means for blanking out another version of said second derivative signals during the periods thus established as including the peaks to obtain a threshold level representative of the remainder of the complex plus noise, each part of each individual waveform complex to be compared having a start and a centre, and means for comparing the original unblanked second derivative signals with said threshold level, means responsive to said comparing for generating a master timing pulse in determined relation to the start of that part of each individual waveform complex which is to be compared with the stored reference waveform and further means responsive to said comparing for generating a master trigger pulse having a determined time relation to the center of said part of the waveform complex.

10. Apparatus according to claim 9, including a delay line through which the recurrent waveform is fed to said trigger section.

11. Apparatus according to claim 7, wherein the means for storing and integrating the normal waveform complex and the means for integrating the waveform complex to be compared include an operational section having operational amplifiers wherein the segments of the stored reference waveform complex and the superimposed waveform complex to be compared with it are successively integrated by the operational amplifiers, and including also a trigger section for generating master timing pulses and master trigger pulses from said recurrent waveform, control means for delivering a sequence of command pulses under the control of the master timing pulses and the master trigger pulses, and means for feeding said command pulses successively to the operational section.

12. Apparatus according to claim 11, wherein the operational section includes amplifier stages comprising said means for determining the difference between the integrated value of each segment of the waveform complex and the corresponding integrated segment of the stored reference waveform, said operational section including said means for adding the magnitudes of said individual differences and means for causing said adding to take place over a time including the start of the waveform complex and the end of the widest expected waveform complex.

13. Apparatus according to claim 11 including a logic section and means connecting same to said operational section for receiving from the operational section an output signal representing "abnormal shape" or "normal shape" in dependence upon the comparison results of said operational section, said logic section including means for delivering a command pulse in response to a "normal shape" signal, said operational section including sample/hold stages, means for feeding said command pulse to said sample/hold stages for causing said stages to sample the values of the waveform complex being held in said operational section.

14. Apparatus according to claim 11 including inhibit means for inhibiting all outputs from the apparatus when the sensed recurrent waveform is degraded by noise to a level severe enough to disturb correct analysis, said inhibit means including means for delivering a warning pulse and an inhibit pulse of such duration and timing as at least to cover the time elapsing between the sensing of the degraded portion of the recurrent waveform up to the completion of the integration and comparison with the stored reference complex.

* * * * *

UNITED STATES PATENT OFFICE
CERTIFICATE OF CORRECTION

Patent No. 3,654,916                    Dated April 11, 1972

Inventor(s) James McEwan McIntyre Neilson

It is certified that error appears in the above-identified patent and that said Letters Patent are hereby corrected as shown below:

Page 1, after "Assignee: The University of Edinburgh, Edinburgh, S.C." add the phrase ---, owner of an undivided one-half interest---.

Signed and sealed this 24th day of April 1973.

(SEAL)
Attest:

EDWARD M. FLETCHER, JR.         ROBERT GOTTSCHALK
Attesting Officer              Commissioner of Patents